United States Patent
Fukuzawa et al.

(10) Patent No.: US 8,654,700 B2
(45) Date of Patent: Feb. 18, 2014

(54) RELAY DEVICE, WIRELESS COMMUNICATION METHOD, AND WIRELESS COMMUNICATION SYSTEM

(75) Inventors: Shoji Fukuzawa, Osaka (JP); Yoshiyuki Tanaka, Osaka (JP)

(73) Assignee: Icom Incorporated (JP)

( * ) Notice: Subject to any disclaimer, the term of this patent is extended or adjusted under 35 U.S.C. 154(b) by 329 days.

(21) Appl. No.: 13/121,942

(22) PCT Filed: Oct. 28, 2009

(86) PCT No.: PCT/JP2009/068538
§ 371 (c)(1),
(2), (4) Date: Mar. 30, 2011

(87) PCT Pub. No.: WO2010/050534
PCT Pub. Date: May 6, 2010

(65) Prior Publication Data
US 2011/0194486 A1  Aug. 11, 2011

(30) Foreign Application Priority Data
Oct. 28, 2008 (JP) .................. 2008-277505

(51) Int. Cl.
*H04B 7/14* (2006.01)
*H04J 1/10* (2006.01)

(52) U.S. Cl.
USPC ........... 370/315; 370/327; 370/281; 370/282; 370/343; 455/11.1; 455/13.1; 455/7

(58) Field of Classification Search
USPC ......... 370/315–327, 281–282, 343; 455/11.1, 455/13.1, 7
See application file for complete search history.

(56) References Cited

U.S. PATENT DOCUMENTS

| | | | |
|---|---|---|---|
| 6,657,978 B1 | 12/2003 | Millman | |
| 2002/0116233 A1* | 8/2002 | Kuge | 705/5 |
| 2006/0193280 A1 | 8/2006 | Lee et al. | |
| 2006/0209671 A1* | 9/2006 | Khan et al. | 370/208 |
| 2008/0107063 A1* | 5/2008 | Oleszczuk | 370/315 |

FOREIGN PATENT DOCUMENTS

| | | |
|---|---|---|
| CN | 1430452 A | 7/2003 |
| CN | 1797989 A | 7/2006 |
| CN | 101208984 A | 6/2008 |
| CN | 101262268 A | 9/2008 |
| JP | 08-070271 | 3/1996 |
| JP | 2007-043232 | 2/2007 |
| JP | 2008-124832 | 5/2008 |

OTHER PUBLICATIONS

Notification of First Office Action issued on Mar. 27, 2013 in corresponding Chinese Application No. 200980141241.5.

* cited by examiner

*Primary Examiner* — Charles C Jiang
*Assistant Examiner* — Jamal Javaid
(74) *Attorney, Agent, or Firm* — Baker & McKenzie LLP

(57) ABSTRACT

A frequency band of 12.5 kHz that two repeaters (2A), (2B) are allowed to utilize is divided into two frequency bands, divisional frequency bands of 6.25 kHz are allocated to respective repeaters (2A), (2B), the repeater (2A) which is one specific repeater suspends transmission of a signal at a certain time set beforehand, another repeater (2B) is instructed to suspend transmission of a signal, and after signal transmission at individual repeaters (2A), (2B) are suspended, the repeater (2A) transmits a defined CW-ID signal which is a call signal given to the whole two repeaters (2A), (2B).

7 Claims, 8 Drawing Sheets

FIG. 7

| ID | BANDWIDTH (kHz) | ID CENTER FREQUENCY (kHz) | CH | BANDWIDTH (kHz) | ID CENTER FREQUENCY (kHz) |
|---|---|---|---|---|---|
| AB | 12.5 | fc1 | A | 6.25 | fc(A) |
|    |      |     | B | 6.25 | fc(B) |
| CD | 12.5 | fc2 | C | 6.25 | fc(C) |
|    |      |     | D | 6.25 | fc(D) |
| --- |    | --- | --- |    | --- |

RELAY DEVICE, WIRELESS COMMUNICATION METHOD, AND WIRELESS COMMUNICATION SYSTEM

RELATED APPLICATION

This application is based on Japanese Patent Application No. 2008-277505 filed on Oct. 28, 2008. The specification, the claims, and the whole drawings of this Japanese Patent Application are herein incorporated by reference.

TECHNICAL FIELD

The present invention relates to a relay device, a wireless communication method, and a wireless communication system. More specifically, the present invention relates to a procedure of transmitting a call sign that is unique identification information allocated in order to specify a relaying station.

BACKGROUND ART

Conventionally known is a wireless communication system that performs a communication between wireless stations or between wireless terminal devices via a relaying station like a repeater station. In order to utilize radio waves when wireless communication is carried out, it is necessary to establish a wireless station and a repeater station which intervenes between wireless stations or between wireless terminal devices must be licensed. At this time, a call sign that is unique identification information is given to the repeater station.

It is obligated for the repeater station to transmit a call sign that is given thereto as unique identification information at a center frequency of a licensed and allocated frequency band for each certain time in utilizing radio waves. The call sign transmitted from the repeater for each certain time is used for monitoring whether or not the quality of radio waves matches the rules like regulations, for monitoring whether or not operation of a wireless station is carried out appropriately in accordance with the rules like regulations, and for checking the utilization situation of the radio waves.

According to the technology disclosed in patent literature 1, a radio-wave-monitoring controlling unit uses a clock to monitor a radio wave level periodically, operates a frequency changing unit to change a frequency to be monitored, receives radio waves induced at an antenna in a set frequency through a radio-wave-monitoring receiving unit, and detects the radio wave level of the received radio waves through an electric wave level detector. It is distinguished whether or not the received radio waves are disturbing waves or communication radio waves by comparing demodulated waves demodulated by a demodulator with a reference radio wave used to carry out wireless communication. The process for monitoring radio waves is executed at a certain cycle through a timer function by the clock, and is successively executed for each communication frequency range for each cycle.

Patent Literature 1: Unexamined Japanese Patent Application KOKAI Publication No. H08-70271

DISCLOSURE OF INVENTION

Problem to be Solved by the Invention

Meanwhile, in order to effectively utilize the frequency resources, recently, narrow-band digital communication having a high frequency-usage efficiency becomes advanced instead of conventional analog communication. During the transition period for the narrow-band communication, both conventional analog communication scheme and new digital communication scheme are present in a mixed manner, and it is necessary to follow the conventional rules made for the analog communication scheme for utilization of radio waves until transition to the digital communication scheme completes.

The present invention has been made in order to overcome the foregoing problem, and it is an object of the present invention to provide a relay device, a wireless communication method, and a wireless communication system all of which are digital and which can be operated in accordance with a conventional rule for utilization of radio waves.

Means for Solving the Problem

To achieve the object, a relay device according to a first aspect of the present invention constitutes a relaying station that relays a communication between wireless terminal devices, and the relay device comprises: transmitting/receiving means which relays a communication between wireless terminal devices at a divisional bandwidth acquired by dividing a bandwidth of an allocated frequency utilized by the relay device into a predetermined number of divisional bandwidths; frequency allocating means which allocates each of the divided frequency bandwidth to the transmitting/receiving means; relaying-operation termination instructing means which instructs each transmitting/receiving means to terminate a relaying operation of a communication between the wireless terminal devices at a certain time set beforehand; and information transmission instructing means which causes one specific transmitting/receiving means to transmit a defined signal that is unique identification information given to the relaying station after the relaying operation by each transmitting/receiving means is terminated.

In the relay device of the first aspect, the transmitting/receiving means comprises transmission frequency changing means which changes a transmission frequency from a center frequency of a bandwidth allocated to each transmitting/receiving means to a center of a bandwidth of an allocated frequency utilized by the relay device when the defined signal that is unique identification is transmitted.

In the relay device of the first aspect, the defined signal represents the given identification information by intermittent of a non-modulated continuous signal.

In the relay device of the first aspect, the defined signal represents the given identification information by audio.

In the relay device of the first aspect, when any one of the transmitting/receiving means is transmitting a signal at the certain time set beforehand, the relaying-operation termination instructing means instructs that transmitting/receiving means to suspend a signal transmission after the signal transmission completes.

To achieve the object, a wireless communication method according to a second aspect of the present invention causes a relay device constituting a relaying station to relay a communication between wireless terminal devices, and the method comprises: causing transmitting/receiving means to relay a communication between wireless terminal devices at a divisional bandwidth acquired by dividing a bandwidth of an allocated frequency utilized by the relay device into a predetermined number of divisional bandwidths; allocating each of the divided frequency bandwidth; instructing termination of a relaying operation of a communication between the wireless terminal devices at a certain time set beforehand; and causing one specific transmitting/receiving means to transmit a defined signal that is unique identification information given to the relaying station after the relaying operation is terminated.

To achieve the object, a wireless communication system according to a third aspect of the present invention causes a relay device constituting a relaying station to relay a communication between wireless terminal devices, the system comprises: transmitting/receiving means which relays a communication between wireless terminal devices at a divisional bandwidth acquired by dividing a bandwidth of an allocated frequency utilized by the relay device into a predetermined number of divisional bandwidths; frequency allocating means which allocates each of the divided frequency bandwidth to the transmitting/receiving means; relaying-operation termination instructing means which instructs each transmitting/receiving means to terminate a relaying operation of a communication between the wireless terminal devices at a certain time set beforehand; and information transmission instructing means which causes one specific transmitting/receiving means to transmit a defined signal that is unique identification information given to the relaying station after the relaying operation by each transmitting/receiving means is terminated.

Effect of the Invention

According to the present invention, a narrowband through a digital communication scheme is realized, the number of communication channels substantially increases, and it becomes possible to carry out operation in accordance with conventional rules for radio wave utilization through an analog communication scheme.

BRIEF DESCRIPTION OF DRAWINGS

FIG. 7 is a diagram showing an allocation of frequency band in FIG. 6; and

BEST MODE FOR CARRYING OUT THE INVENTION

An explanation will be given of an embodiment of a relay device, a wireless communication method, and a wireless communication system according to the present invention with reference to the accompanying drawings.

Figure 1:
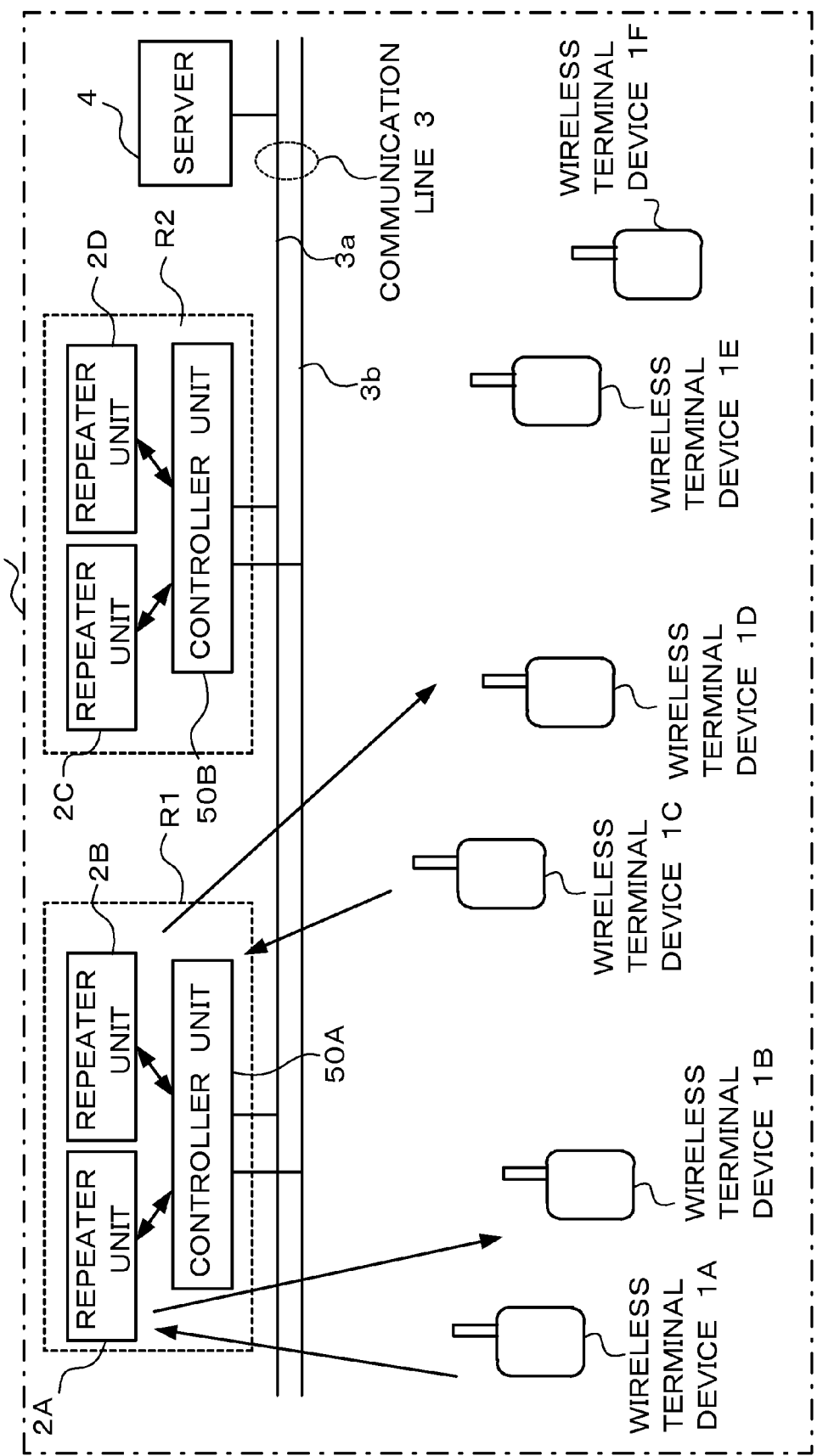
FIG. 1 is a diagram showing a configuration of a wireless communication system according to an embodiment of the present invention.

As shown in FIG. 1, a wireless communication system 10 of the present embodiment includes repeater systems R1, R2, wireless terminal devices 1 (1A to 1F), and a server 4. The wireless communication system 10 constitutes a trunking system where the wireless terminal devices 1 (1A to 1F) shear repeater units 2A, 2B, and other plural repeater units, and arbitrarily select at least one of those units for relaying. Unlike Dedicated Control Methods having a control channel, the trunking system is of a Distributed Control Method which has no dedicated control channel.

The repeater system R1 comprises the two repeater unit 2A (hereinafter, repeater 2A) and repeater unit 2B (hereinafter, repeater 2B), and a controller unit 50A which controls both repeaters 2A, 2B. The repeater system R2 comprises two repeater unit 2C (hereinafter, repeater 2C) and repeater unit 2D (hereinafter repeater 2D), and a controller unit 50B which controls both repeaters 2C, 2D. The repeaters 2A to 2D are compatible with 30 channels at maximum, and all channels can be used for audio.

The repeater system R1 functions as a relaying station to which a call sign ID (AB) that is unique identification information is given, and to which a frequency band is allocated. Likewise, the repeater system R2 functions as a relaying station to which a call sign ID (CD) that is unique identification information is given and to which a frequency band is allocated. The call sign and the frequency band will be discussed in detail later.

In FIG. 1, the repeater systems R1, R2 each includes two repeaters, but can include equal to three or more repeaters. Moreover, the repeater systems R1, R2 each corresponds to a relay device in claims, and repeaters 2A, 2B, 2C, and 2D each corresponds to transmitting/receiving means. In the present embodiment, the repeater systems R1, R2 are each allowed to use a frequency band of 12.5 kHz. Accordingly, the repeaters 2A, 2B, 2C, and 2D each relays a communication between wireless terminal devices 1 at a bandwidth of 6.25 kHz.

The plural wireless terminal devices 1 (1A, 1B, 1C, 1D, 1E, and 1F) communicate with each other via at least one repeater among the four repeaters 2 (2A, 2B, 2C, and 2D) and exchange a wireless signal on which a digital signal, such as audio, data, identification information, or a control command, is superimposed.

Each repeater 2 amplifies a radio signal received from the wireless terminal device 1 that is a transmission originator, performs a predetermined signal processing on the amplified signal, and transmits such a processed signal to the wireless terminal device 1 that is a transmission destination or to another repeater 2 which relays this wireless terminal device 1. Moreover, as shown in FIG. 1, the plural repeaters 2A, 2B, 2C, and 2D are connected to a communication line 3 via respective controller units 50 (50A, 50B).

The communication line 3 is a two-line system comprised of a communication line 3a and a communication line 3b. The communication line 3a comprises, for example, a wired LAN (Local Area Network) or a wireless LAN, a line switching network, a packet switching network, the Internet, or an exclusive line, and is connected to the server 4. Conversely, the communication line 3b is a system bus that connects the plural repeaters 2A, 2B, 2C, and 2D together via the controller units 50. Each repeater shears various information on other repeaters via this system bus. In the following explanation, a term system bus means a communication line that is of a broader concept thereof.

Information on each repeater is exchanged via the system bus, and the repeaters shear those pieces of information one another. Information on each repeater is transmitted to plural time slot corresponding to each repeater in a predetermined order in a circulating manner. At a timing of transmitting data to another repeater, through which time slot data is transmitted is set beforehand, so that data is transmitted to a set time slot. One repeater among the plural repeaters 2 connected together via the system bus is set to be a "master repeater". In the present embodiment, the repeater 2A is the master repeater. A synchronization signal of the system bus is transmitted by the master repeater 2A.

Figure 2:
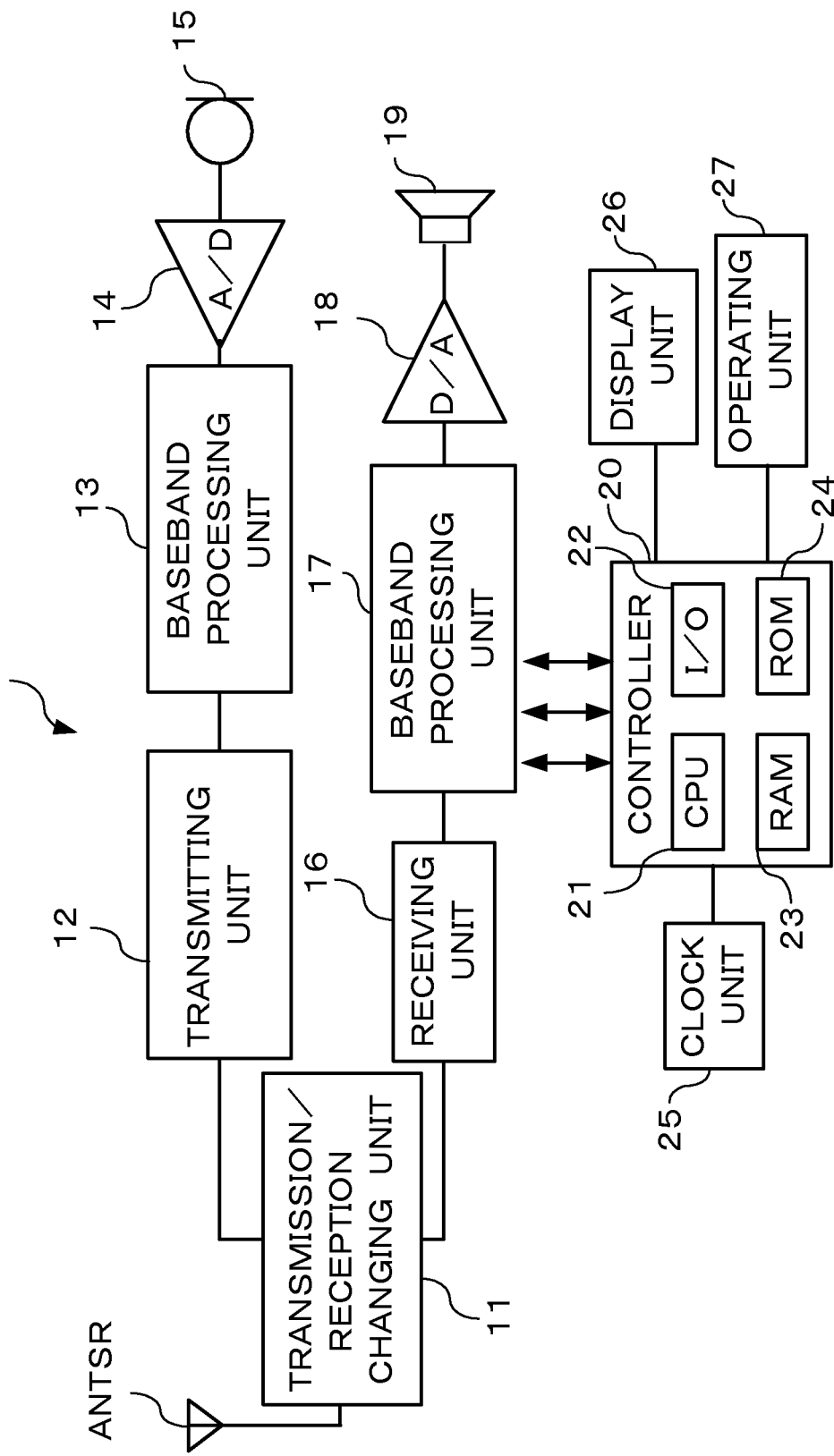
FIG. 2 is a block diagram showing a configuration of a wireless terminal device shown in FIG. 1.
Figure 3:
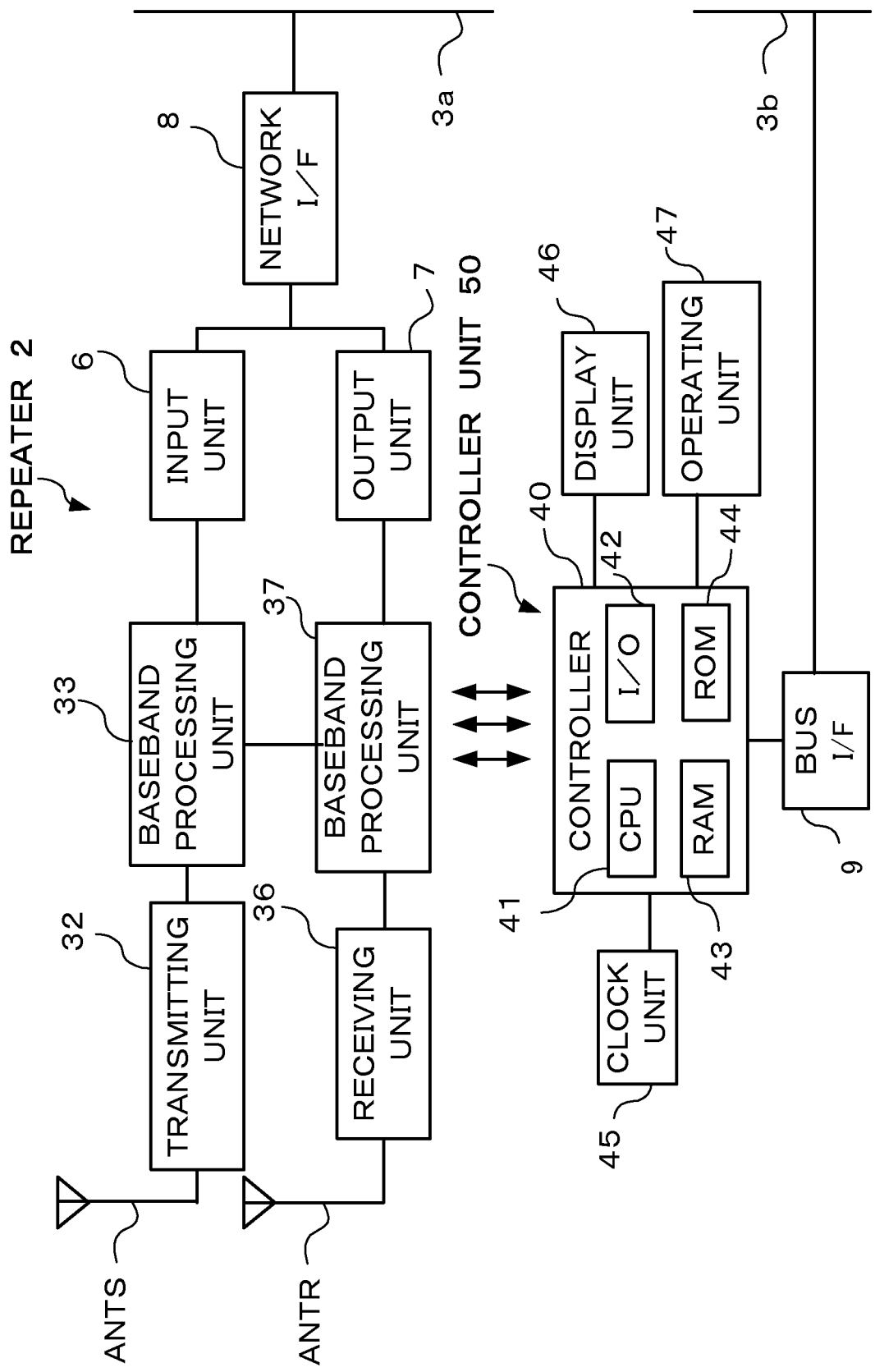
FIG. 3 is a block diagram showing a configuration of a repeater system shown in FIG. 1.

Next, an explanation will be given of the structure of the wireless terminal device 1 and that of the repeater 2. FIG. 2 is a block diagram showing the structure of the wireless terminal device 1 shown in FIG. 1. FIG. 3 is a block diagram showing the structure of the repeater system R1 shown in FIG. 1 (which is same as that of the repeater system R2). In FIG. 1, the two repeaters 2A, 2B are blocks of a signaling system and have the same structure, so that only one repeater is shown in FIG. 3.

As shown in FIG. 2, the wireless terminal device 1 has, as blocks of a signaling system, an antenna ANTSR, a transmission/reception changing unit 11, a transmitting unit 12, a baseband processing unit 13, an A/D converter 14, a microphone 15, a receiving unit 16, a baseband processing unit 17, a D/A converter 18, and a speaker 19. Moreover, the wireless terminal device 1 has, as blocks of a controlling system, a controller 20, a clock unit 25, a display unit 26, and an operating unit 27. Furthermore, the controller 20 has a CPU (Central Processing Unit) 21, an I/O (input/output unit) 22, a RAM (Random Access Memory) 23, a ROM (Read-Only Memory) 24, and an internal bus connecting those units together.

In the wireless terminal device 1 shown in FIG. 2, the CPU 21 of the controlling system controls the blocks of the signaling system. The CPU 21 runs a control program stored in the ROM 24 to control the whole wireless terminal device 1, processes commands and data input from the operating unit 27 through the I/O 22 and data acquired from the baseband processing unit 17, temporarily stores those pieces of data in the RAM 23, and displays the stored command or data on the display unit 26 comprising displaying means like an LCD (Liquid Crystal Display) as needed.

Moreover, the CPU 21 displays a current time acquired by the clock unit 25 on the display unit 26, and counts a clock pulse input from the clock unit 25 to generate an interruption when reaching a timer value set beforehand.

Next, an explanation will be given of a general operation of the blocks of the signaling system. The transmission/reception changing unit 11 has one end connected to the antenna ANTSR, and has another end selectively connected to the transmitting unit 12 or the receiving unit 16 under the control of the CPU 21. When no transmission operation (e.g., depression of a PPT button) is made through the operating unit 27, another end of the transmission/reception changing unit 11 is connected to the receiving unit 16, so that the wireless terminal device is in a receiving (standby) mode, but when a transmission operation is made through the operating unit 27, another end of the transmission/reception changing unit 11 is connected to the transmitting unit 12 and the mode of the wireless terminal device changes to a transmitting mode.

The microphone 15 inputs an audio of a user and outputs an analog audio signal to the A/D converter 14 in the transmitting mode.

The A/D converter 14 converts the audio signal from the microphone 15 from analog to digital, and outputs a digital signal to the baseband processing unit 13.

The baseband processing unit 13 generates a frame that is a unit of a radio signal based on the audio-signal data from the A/D converter 14 or based on data stored in the RAM 23 of the controller 20, and outputs the frame to the transmitting unit 12. The configuration of a frame will be discussed later in detail.

The transmitting unit 12 modulates the frame from the baseband processing unit 13, and transmits the modulated frame to the repeater 2 which is currently performing a relaying operation through the transmission/reception changing unit 11 and the antenna ANTSR. An example of the modulation scheme by the transmitting unit 12 is GMSK (Gaussian filtered Minimum Shift Keying), PSK (Phase Shift Keying), QAM (Quadrature Amplitude Modulation), or FSK (Frequency Shift Keying).

When the wireless terminal device 1 is in a receiving mode, as receiving a radio signal from the repeater 2, the transmission/reception changing unit 11 outputs the received signal input through the antenna ANTSR to the receiving unit 16.

The receiving unit 16 amplifies the received signal output by the transmission/reception changing unit 11, and performs a signal processing like a demodulation process on such a signal, and outputs the demodulated signal to the baseband processing unit 17.

The baseband processing unit 17 extracts a frame from the demodulated signal output by the receiving unit 16. Furthermore, the baseband processing unit 17 outputs information on the extracted frame to the CPU 21. The CPU 21 analyzes the information on the frame, and when the transmission destination of the received signal is the local terminal, causes the baseband processing unit 17 to output audio-signal data included in the frame to the D/A converter 18, and, temporarily stores data other than an audio signal in the RAM 23, and displays such data on the display unit 26 as needed.

The D/A converter 18 converts the audio signal from the baseband processing unit 17 from digital to analog, and causes the speaker 19 to output the converted signal.

The repeater 2 constitutes transmitting/receiving means which exchanges a radio signal between the wireless terminal devices 1, and as shown in FIG. 3, has an antenna ANTS for transmission only, a transmitting unit 32, a baseband processing unit 33, an antenna ANTR for reception only, a receiving unit 36, a baseband processing unit 37, an input unit 6, an output unit 7, and a network I/F (interface) 8.

The controller 50 is a block of the controlling system which controls the repeater 2 belonging to the same repeater system (e.g., the repeater system R1 or the repeater system R2), and has a controller 40, a clock unit 45, a display unit 46, and an operating unit 47. The controller 40 has a CPU (Central Processing Unit) 41, an I/O (Input/Output unit) 42, a RAM (Random Access Memory) 43, a ROM (Read-Only Memory) 44, and an internal bus (not illustrated) connecting those units together. In addition, the controller unit 50 has an I/F (interface) 9 for transmitting information on the repeater 2 belonging to the same repeater system to a system bus to be discussed later and for acquiring information from the repeater 2 belonging to another repeater system.

The repeater 2 performs signal processing, such as an amplification process and a waveform process, on a radio signal received from the transmission-originator wireless terminal device 1, and transmits such processed signal to the transmission-destination wireless terminal device 1, and has basically the same configuration as that of the wireless terminal device 1 shown in FIG. 2. For example, it is appropriate if the transmitting unit 32 has the same configuration as that of the transmitting unit 12, the baseband processing unit 33 has the same configuration as that of the baseband processing unit 13, the receiving unit 36 has the same configuration as that of the receiving unit 16, and the baseband processing unit 37 has the same configuration as that of the baseband processing unit 17. Moreover, it is appropriate in the controller unit 50 if, for example, the controller 40 has the same configuration as that of the controller 20, the CPU 41 has the same configuration as that of the CPU 21, the I/O 42 has the same configuration as that of the I/O 22, the RAM 43 has the same configuration as that of the RAM 23, the ROM 44 has the same configuration as that of the ROM 24, the clock unit 45 has the same configuration as that of the clock unit 25, the display unit 46 has the same configuration as that of the display unit 26, and the operating unit 47 has the same configuration as that of the operating unit 27.

When the wireless terminal devices 1 communicate with each other via the repeater 2, the uplink for a transmission from the wireless terminal device 1 to the repeater 2 and the downlink for a transmission from the repeater 2 to the wireless terminal device 1 are subjected to simultaneous communication with a frequency or a time slot being changed. Accordingly, as explained above, the repeater 2 has the antenna ANTS only for transmission and the antenna ANTR only for reception. The input unit 6 inputs control data from the server 4 via the network I/F 8 under the input control of the CPU 41, and the output unit 7 outputs data or the like requested by the server 4 via the network I/F 8 under the output control of the CPU 41. Furthermore, when a multisite network for establishing a communication with another wireless communication system 10 constituting another communication area is built, communication frames are exchanged with the repeater 2 in another wireless communication system 10 via the network I/F 8. A bus I/F 9 acquires a synchronization signal transmitted from the master repeater 2 to the system bus and repeater information transmitted from the repeater other than the local repeater to the system bus under the input control of the CPU 41, and intervenes transmission of information on the local device to the system bus under the output control of the CPU 41.

Figure 4:
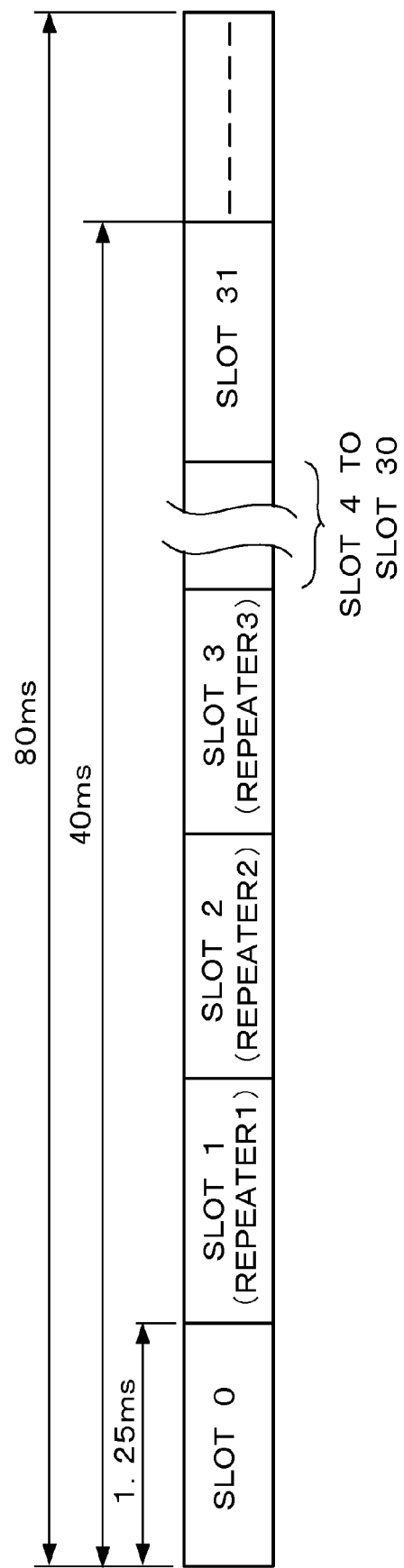
FIG. 4 is a diagram showing a synchronization signal output to a system bus from a master repeater shown in FIG. 1 and including a time slot allocated to each repeater following the synchronization signal.
Figure 5:
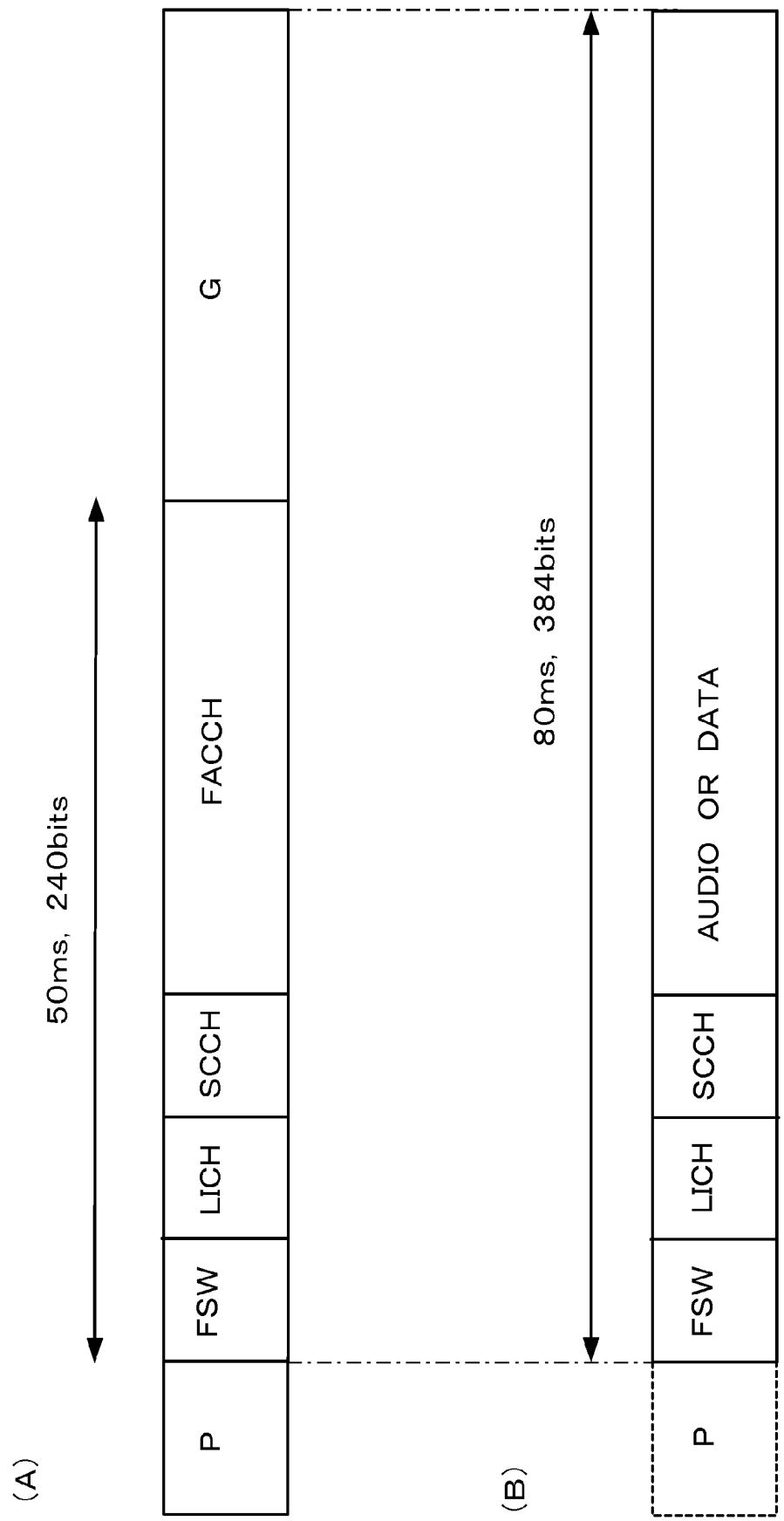
FIG. 5A is a diagram showing a format of a frame exchanged between a repeater and a wireless terminal device both shown in FIG. 1.
FIG. 5B is a diagram showing a format of a frame exchanged between a repeater and a wireless terminal device both shown in FIG. 1.
Figure 6:
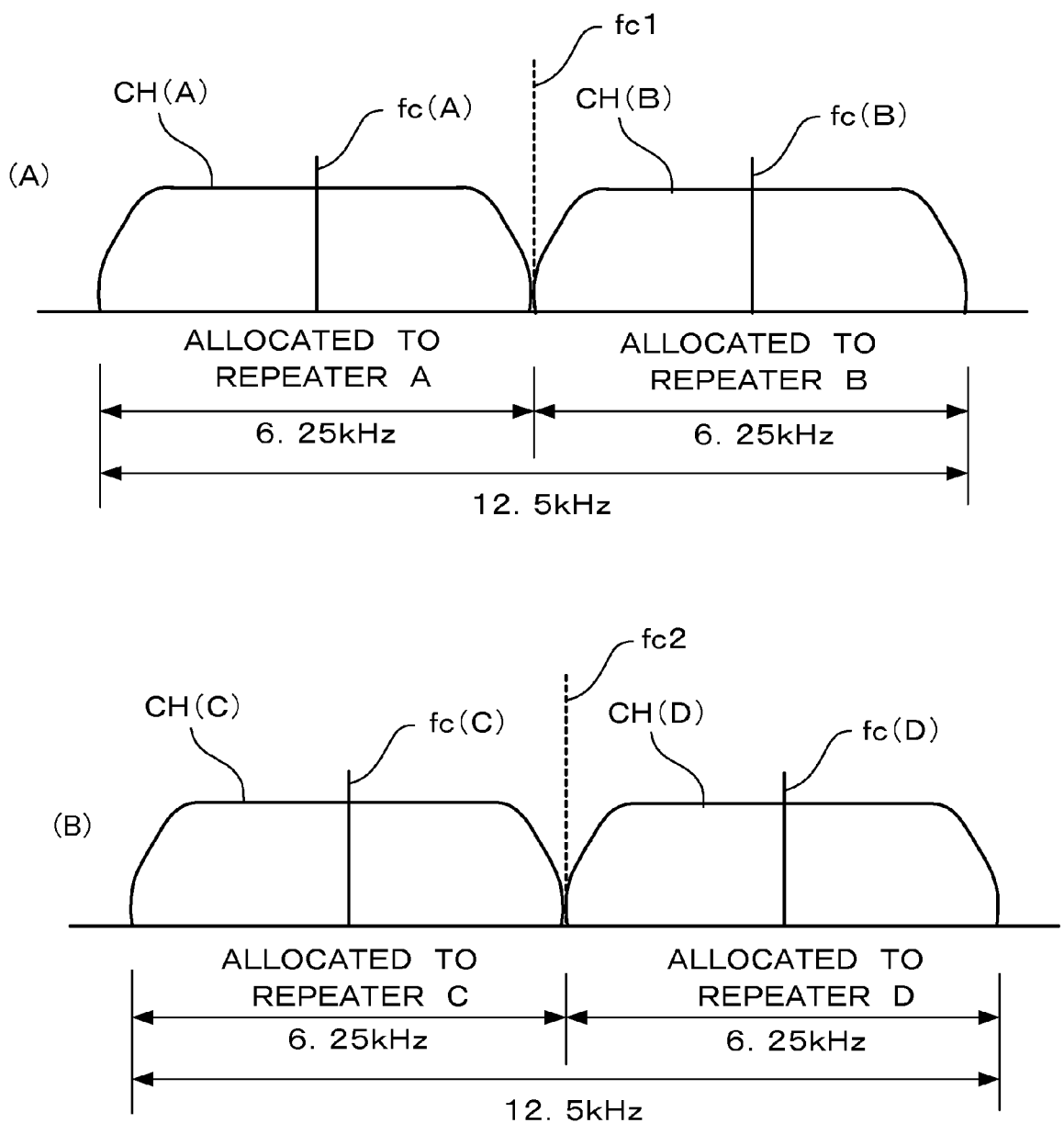
FIG. 6A is a diagram showing a signal waveform representing a frequency band of a narrow band that a whole of a pair of repeaters are allowed to use.
FIG. 6B is a diagram showing a signal waveform representing a frequency band of a narrow band that a whole of a pair of repeaters are allowed to use.

Next, an explanation will be given of a communication procedure in the wireless communication system 10 of the first embodiment with reference to FIGS. 4 to 8. FIG. 4 is a diagram showing a synchronization signal output to the system bus 3b from the master repeater and a slot which is a time slot corresponding to each repeater following the synchronization signal. FIGS. 5A, 5B are diagrams showing a format of a frame transmitted from the repeater 2 to the wireless terminal device 1. FIGS. 6A, 6B are diagrams showing a signal waveform representing a frequency band that a whole of the pair of repeater 2A (or 2C) and repeater 2B (or 2D) of FIG. 1 are allowed to use. FIG. 7 is a diagram showing an example allocation of frequency band in FIG. 6.

As an example for explaining a slot shown in FIG. 4, let us suppose that the repeater 2A among the repeaters 2A to 2D and other repeaters (not illustrated) constituting the same communication area is the master repeater. Note that any one of the repeaters 2A to 2D and other repeaters (not illustrated) constituting the same communication area can be the master repeater. A slot shown in FIG. 4 is utilized for, for example, transmission of a synchronization signal transmitted from the repeater 2A which is the master repeater, and for transmission of information on each repeater 2A to 2D and each of the other repeaters (not illustrated) constituting the same communication area.

In FIG. 4, a synchronization signal has a period which is 80 ms, and the first-half 40 ms includes 32 slots from slot 0 to slot 31. Accordingly, each slot has a time length of 1.25 ms. The first slot is used for transmitting a synchronization signal. The synchronization signal is transmitted by the one specific repeater 2A which is the master repeater in accordance with a preset algorithm, and another repeater automatically serves as a slave repeater and acquires the synchronization signal. The plural repeaters including the repeaters 2A to 2D and constituting the same communication area operate in synchronization with such a synchronization signal. Any one of slots 1 to 31 other than slot 0 for synchronization is allocated to each of the plural repeaters constituting the same communication area, and information on each repeater sheared among the plural repeaters constituting the same communication area is written in a slot allocated to the local device. In this case, the repeater 2A which is the master repeater transmits a synchronization signal with slot 0, and writes information on the repeater 2A in a slot allocated to the repeater 2A among slot 1 to slot 31. Note that the last slot 31 is used for external connection for a future extended capability.

FIG. 5A shows a format of a communication frame when a link is established with a communication channel, and FIG. 5B shows a format of a communication frame when in audio and data communication. The format of a communication frame exchanged between the repeater 2 and the wireless terminal device 1 has a period which is 80 ms, and is configured by 384 bits. In FIG. 5, P stands for a preamble (at the time of initial transmission only), FSW stands for a frame synchronization word, LICH stands for link information, SCCH stands for signaling control, FACCH stands for fast-speed associated control, and G stands for guard time. In FIG. 5B, at the time of audio communication, audio data following SCCH is inserted, and at the time of data communication, data is inserted. When establishing a communication with another wireless terminal device 1, the wireless terminal device 1 transmits the format of a communication frame at the time of link establishment shown in FIG. 5A to the repeater 2 having an unused channel, and as receiving a response to the effect that a communication is permitted from the repeater 2, communicates with another wireless terminal device 1 via the repeater 2 in the format of a communication frame at the time of audio and data communication shown in FIG. 5B.

A relaying station comprising the repeater system R1 shown in FIG. 1 has a permission to use a frequency band of 12.5 kHz. As a condition for such permission, i.e., for a license of radio wave transmission, it is obligated to accordingly transmit a call sign given to the relaying station comprising the repeater system R1 by a Morse code realized by intermittent of a CW signal at a center frequency fc1 of the frequency band of 12.5 kHz.

As shown in FIG. 6A, the frequency band of 12.5 kHz is divided into two bands, and a band (divisional frequency band) of 6.25 kHz which is a lower frequency than the center frequency fc1 is allocated to the repeater 2A, while a divisional frequency band of 6.25 kHz which is a higher frequency than the center frequency fc1 is allocated to the repeater 2B. The repeater 2A and the repeater 2B each utilizes an independent channel CH (A) and CH(B) which is a frequency band of 6.25 kHz to relay a communication between the wireless terminal devices. A center frequency fc(A) of the channel CH(A) is "fc1−6.25 kHz/2", and a center frequency fc(B) of the channel CH(B) is "fc1+6.25 kHz/2".

Likewise, as shown in FIG. 6B, the repeater 2C and the repeater 2D are also allowed to utilize a frequency band of 12.5 kHz having a center frequency fc2, the repeater 2C utilize a channel CH (C) of a frequency band of 6.25 kHz which is a lower frequency than the center frequency fc2 to relay a communication between the wireless terminal devices, and the repeater 2D utilizes a channel CH(D) of a frequency band of 6.25 kHz which is a higher frequency than the center frequency fc2 to relay a communication between the wireless terminal devices. A center frequency fc(C) of the channel CH(C) is "fc2−6.25 kHz/2", and a center frequency fc(D) of the channel CH (D) is "fc2+6.25 kHz/2".

FIG. 7 shows the above-explained relationship in a table. The center frequency of the frequency band of 12.5 kHz that the repeater 2A and the repeater 2B are allowed to utilize is fc1. Accordingly, it is obligated for the repeaters 2A and 2B to suitably transmit respective IDs, i.e., respective call signs by intermittent of a CW signal at the center frequency fc1. Moreover, it is obligated for the repeaters 2C and 2D to suitably transmit respective IDs, i.e., respective call signs by intermittent of a CW signal at the center frequency fc2.

Accordingly, call signs (IDs) AB, CD each of which is unique identification information are given to the two relaying stations R1 and R2 that are allowed to utilize the frequency band of 12.5 kHz, and each repeater can independently relay a communication between the wireless terminal devices.

The frequency band of 12.5 kHz that the repeaters are allowed to use is divided into 6.25-kHz channels with respective center frequencies of fc(A), fc(B), fc(C), fc(D), etc.

Accordingly, each center frequency fc (fc=fc1, fc2, ... fcn) is a frequency that the repeater 2 does not utilize in a normal operation. In a normal operation, a CW signal at the center frequency fc (fc=fc1, fc2, ..., fcn) cannot be transmitted. Moreover, when the repeater 2A is transmitting a call sign, if the repeater 2B executes a normal relaying process, appropriate transmission of a call sign is disabled.

Figure 8:
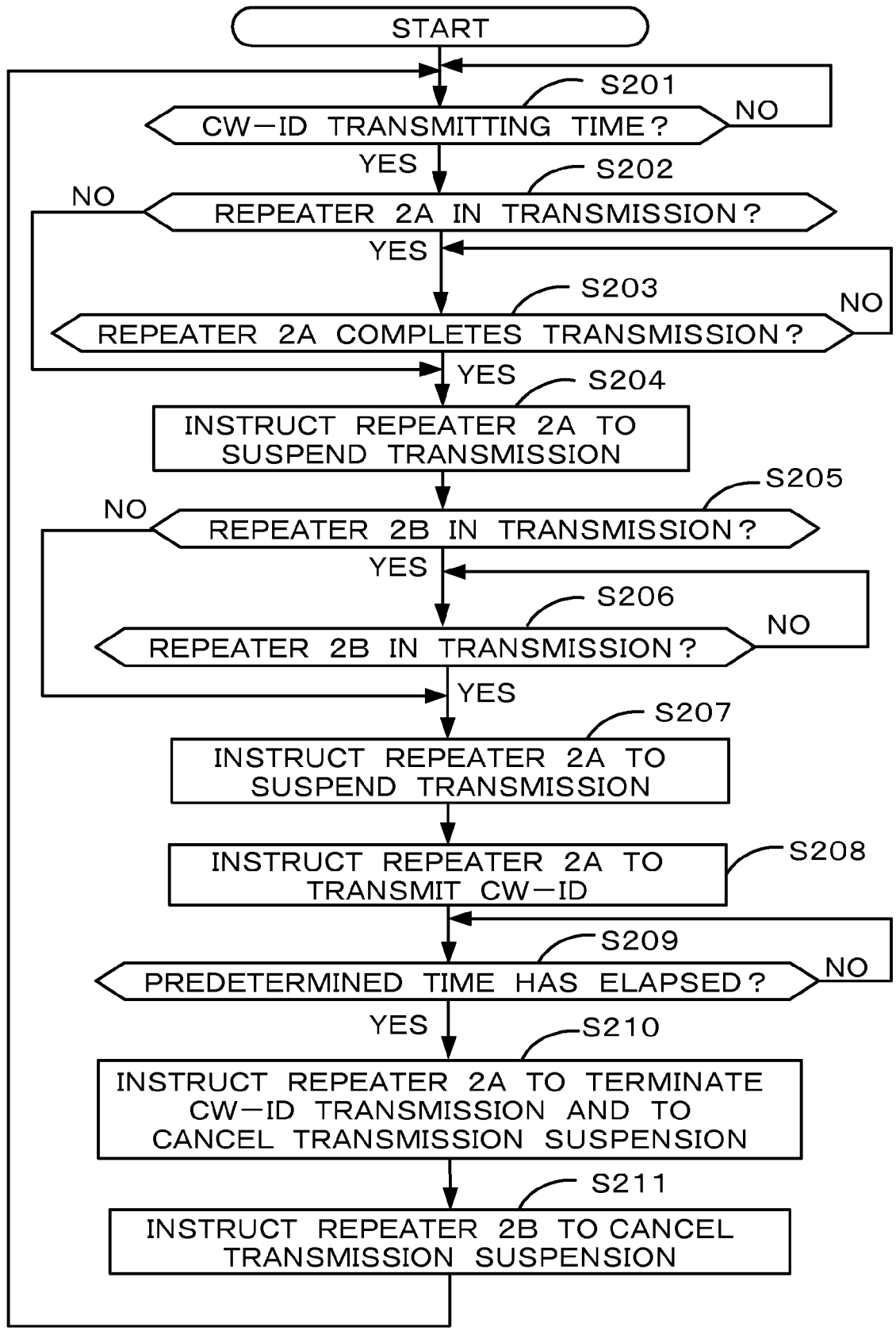
FIG. 8 is a flowchart for a CW transmission control executed by a CPU shown in FIG. 3.

In the present embodiment, each repeater 2 appropriately transmits a call sign through a process shown in the flowchart of FIG. 8.

FIG. 8 is a flowchart of an operation of a CW-ID transmission control in the controller unit 50A of the repeater system R1 shown in FIG. 1.

The controller unit 50A of the repeater system R1 shown in FIG. 1 performs CW-ID transmission control by means of the CPU 41 of the controller 40 shown in FIG. 3. In this example, the repeater 2A transmits an ID at the center frequency fc1 of the frequency band of 12.5 kHz that the relaying station comprising the repeater system R1 is allowed to use by intermittent of a CW signal.

The CPU 41 that controls the repeater 2A (corresponding to one specific relay device and specific transmitting/receiving means) which is the repeater (main unit) at a side of transmitting an ID repeatedly executing the process shown in FIG. 8 in a time-shearing manner after power is turned on, and determines whether or not it becomes a timing of CW-ID transmission for each certain time (step S201). When it becomes the timing of CW-ID transmission, it is determined whether or not the repeater 2A is performing transmission (relaying) (step S202).

When the repeater 2A is performing transmission (relaying), it is further determined that whether or not the repeater 2A completes transmission, and it stands by until completion of transmission (step S203). When transmission by the repeater 2A completes and when it is determined in the step S202 that the repeater 2A is not performing transmission (relaying) (step S202: NO), the repeater 2A is instructed to suspend transmission (step S204).

Next, it is determined whether or not the repeater 2B is performing transmission (relaying) (step S205), and when the repeater 2B is performing transmission, it stands by until transmission completes (step S206). When transmission by the repeater 2B completes, and when it is determined in the step S205 that the repeater 2B is not performing transmission (relaying) (step S205: NO), the repeater 2B is instructed to suspend transmission (step S207). Note that according to the transmission control operation shown in FIG. 8, the processes at the step S203 and at the step S204 and the processes at the step S205 and at the step S206 are successively (in a serial manner) executed. However, the present invention is not limited to this case, and for example, when the repeater is performing transmission (relaying) in the step S202, the processes at the step S203 and at the step S204 and the processes at the step S205 and at the step S206 may be executed in a parallel manner, and when the process at the step S204 is executed or when it is determined in the step S205 that the repeater is not performing transmission (relaying), or, when transmission completes in the step S206, the process at the step S207 may be executed.

After transmission by the repeaters 2A and 2B is suspended, the repeater 2A is instructed to transmit a CW-ID (step S208). At this time, the transmission frequency fc(A) of the repeater 2A is 3.125 kHz lower than the frequency fc1, the transmission frequency is set to be fc(A)+3.125 kHz, and a CW-ID is transmitted at the center frequency fc1 of the frequency band of 12.5 kHz. After the repeater 2A starts transmitting the CW-ID, it is determined whether or not a predetermined time has elapsed (step S209). After the predetermined time has elapsed, the repeater 2A is instructed to suspend transmission of the CW-ID, and an instruction of cancelling suspension of transmission is given in order to permit restating of relaying (step S210). The repeater 2A which has received the instruction of cancelling suspension of transmission returns the transmission frequency from fc1 to fc(A). Moreover, the repeater 2B is instructed to cancel suspension of transmission to permit restarting of relaying (step S211). Thereafter, the process returns to the step S201, and it stands by for a next timing of CW-ID transmission.

As explained above, according to the foregoing embodiment, a frequency band that a relaying station comprising the repeater system R1 is allowed to use is divided into two bands, and the divisional frequency band is allocated to each of the repeaters 2A, 2B, each repeater 2A, 2B is instructed to suspend signal transmission at a time set beforehand, and after suspension of signal transmission at each repeater 2A, 2B, the repeater 2A is caused to transmit a signal of CW-ID that is a call sign which is unique identification information given to the relaying station. Accordingly, a narrow band in a digital communication scheme is realized, and the number of communication channels is substantially increased, and, an operation in accordance with conventional rules for radio wave utilization through an analog communication scheme is enabled.

The foregoing embodiment is merely for explaining the present invention, and the present invention is not limited to the foregoing embodiment. Other embodiments and modified examples which can be thought out by those skilled in the art are included in the present invention unless departing from the scope and the spirit of the present invention.

For example, in the foregoing embodiment, a unique call sign is represented by transmission of a CW signal, but the call sign may be represented by transmission of an audio signal.

Moreover, in the foregoing embodiment, when the repeater is performing transmission (relaying), a CW-ID is transmitted after such transmission completes, but even when the repeater is performing transmission, such transmission may be interrupted and the CW-ID may be transmitted. Moreover, as information on each repeater is exchanged over the system bus and sheared, information to the effect that a CW-ID is being transmitted or such transmission of a CW-ID completes may be written in a time slot, and it may be configured such that all repeaters constituting the same communication area do not become transmitting a CW-ID at the same period. This suppresses any temporally disabled communication with a wireless terminal device in a communication area configured by the plural repeaters.

In the foregoing embodiment, the transmitting/receiving means, relaying-operation termination instructing means, information transmission instructing means, and transmission frequency changing means correspond to the functions of a software for the CPU 41 shown in FIG. 3, but such individual means may be configured by a hardware like electronic circuit. Moreover, either one of the repeater 2A or the repeater 2B may be set to serve as a main unit, and the CPU 41 of the controller 40 possessed by the controller 50 that controls the repeater set as the main unit may execute the control shown in the flowchart of FIG. 8.

When the frequency band allocated to the relaying station is divided into equal to three or more frequency bands (when the number of repeaters constituting the repeater system is equal to three or more), the same technique can be applied to suspend transmission of all repeater, and any one of the repeater may transmit a call sign. The foregoing numeric values are just examples, and for example, other frequency bands, such as 10 kHz or 8 kHz, may be allocated to each relaying station instead of the frequency band of 12.5 kHz. Furthermore, arbitrary identification information and signals other than a call sign may be transmitted.

DESCRIPTION OF REFERENCE NUMERAL 1A to 1F Wireless terminal device
R1, R2 Repeater system
2A to 2D Repeater (repeater unit)
3 Communication line
50A, 50B Controller unit

The invention claimed is:

1. A relay device that relays a communication between wireless terminal devices, the relay device comprising:
   one or more repeater units each operable to relay the communication between wireless terminal devices at a divisional bandwidth acquired by dividing a bandwidth of an allocated frequency utilized by the relay device into a predetermined number of divisional bandwidths; and
   a controller unit operable to:
      allocate each of the divisional bandwidths to each repeater unit;
      instruct each repeater unit to terminate a relaying operation of the communication between the wireless terminal devices at a certain time set beforehand; and
      cause one specific repeater unit to transmit a defined signal that is unique identification information given to the relay device after the relaying operation by each repeater unit is terminated.

2. The relay device according to claim 1, wherein the controller unit is further operable to change a transmission frequency from a center frequency of a bandwidth allocated to each repeater unit to a center of a bandwidth of an allocated frequency utilized by the relay device when the defined signal that is unique identification is transmitted.

3. The relay device according to claim 1, wherein the defined signal represents the given identification information by intermittent transmission of a non-modulated continuous signal.

4. The relay device according to claim 1, wherein the defined signal represents the given identification information by audio.

5. The relay device according to claim 1, wherein when any one of the repeater units is transmitting a signal at the certain time set beforehand, the controller unit instructs that repeater unit to suspend a signal transmission after the signal transmission completes.

6. A wireless communication method which causes a relay device comprising one or more repeater units and a controller unit to relay a communication between wireless terminal devices, the method comprising:
   causing the one or more repeater units to relay the communication between wireless terminal devices at a divisional bandwidth acquired by dividing a bandwidth of an allocated frequency utilized by the relay device into a predetermined number of divisional bandwidths; and
   causing the controller unit to perform the following:
      allocate each of the divisional bandwidths;
      instruct termination of a relaying operation of the communication between the wireless terminal devices at a certain time set beforehand; and
      cause one specific repeater unit to transmit a defined signal that is unique identification information given to the relay device after the relaying operation is terminated.

7. A wireless communication system causing a relay device to relay a communication between wireless terminal devices, the system comprising:
   one or more repeater units which relay the communication between wireless terminal devices at a divisional bandwidth acquired by dividing a bandwidth of an allocated frequency utilized by the relay device into a predetermined number of divisional bandwidths; and
   a controller unit that performs the following:
      allocate each of the divisional bandwidths to the repeater units;
      instruct each repeater unit to terminate a relaying operation of the communication between the wireless terminal devices at a certain time set beforehand; and
      cause one specific repeater unit to transmit a defined signal that is unique identification information given to the relay device after the relaying operation by each repeater unit is terminated.

* * * * *